(12) United States Patent
Jin et al.

(10) Patent No.: US 6,320,743 B1
(45) Date of Patent: Nov. 20, 2001

(54) KEYBOARD ENGAGING STRUCTURE FOR NOTEBOOK PC

(75) Inventors: Byoung Yoon Jin, Koonsan; Byeong Duk An, Oasn, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/397,024

(22) Filed: Sep. 16, 1999

(30) Foreign Application Priority Data

Sep. 18, 1998 (KR) .................................................. 98-38609

(51) Int. Cl.[7] ........................................................ G06F 1/16
(52) U.S. Cl. ............................................. 361/680; 361/727
(58) Field of Search ................................... 361/680, 727; 400/472, 663, 679, 680, 682

(56) References Cited

U.S. PATENT DOCUMENTS 5,966,284 * 10/1999 Youn et al. ........................ 361/680

* cited by examiner

Primary Examiner—Leo P. Picard
Assistant Examiner—Yean-Hsi Chang
(74) Attorney, Agent, or Firm—Birch, Stewart, Kolasch & Birch, LLP (57) ABSTRACT

A keyboard engaging apparatus for a notebook PC includes a portable computer main body, a keyboard having one end engaged with the main body, a moveable latch in the main body to retain an opposite end of the keyboard, a slidable switch extending through a surface of the main body with which a user may retract the moveable latch, and a connecting assembly connected to the slidable switch and the moveable latch to transfer movement therebetween.

12 Claims, 6 Drawing Sheets

KEYBOARD ENGAGING STRUCTURE FOR NOTEBOOK PC

BACKGROUND OF THE INVENTION

1. Field of the Invention

The present invention relates to a keyboard engaging structure for a portable computer, and in particular to a keyboard engaging structure capable of hiding a keyboard fixing unit, which fixes a keyboard to a main body, and facilitating the upgrading of a certain unit such as a module, etc.

2. Description of the Background Art

Figure 1:
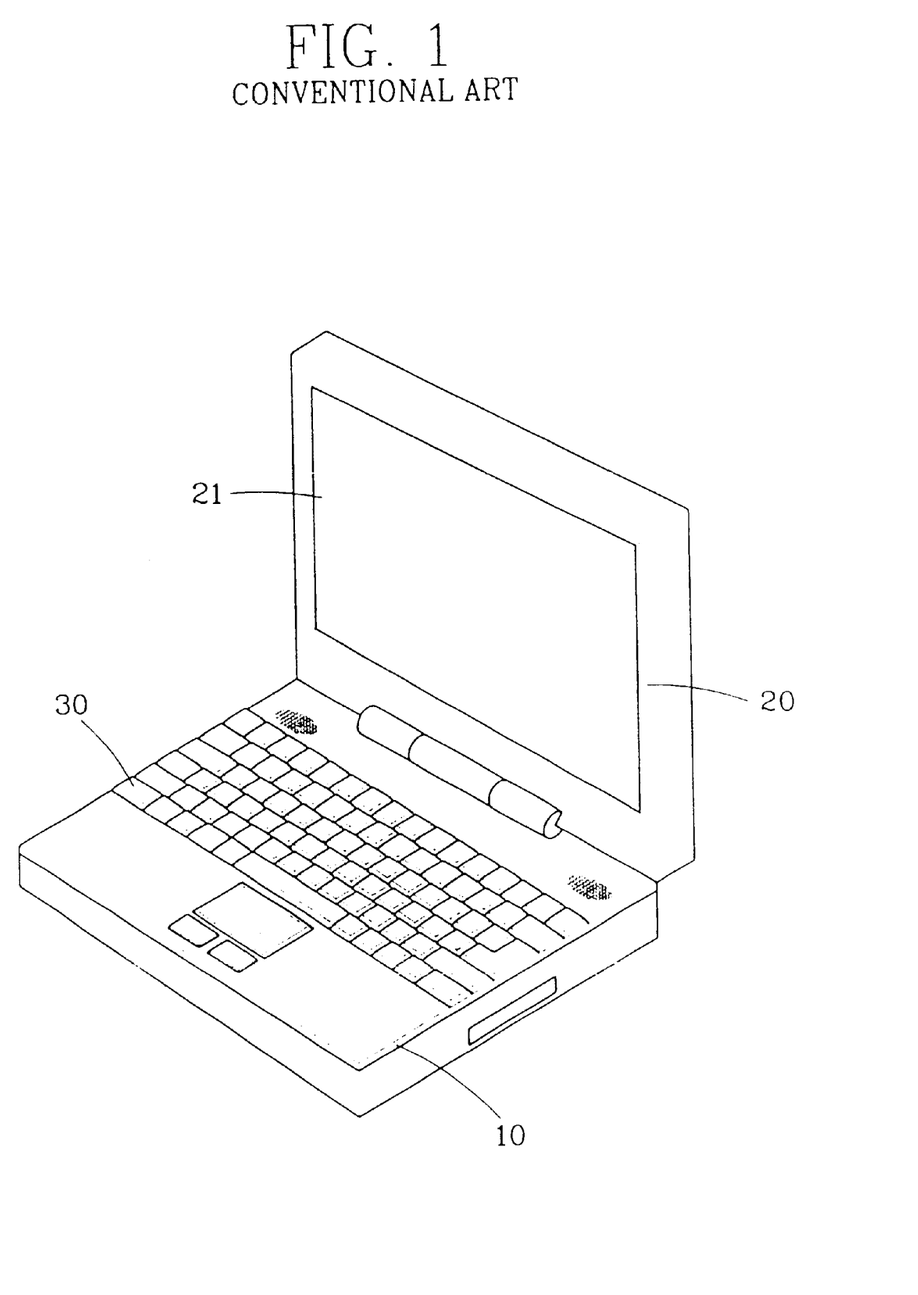
FIG. 1 is a perspective view illustrating a conventional notebook PC.
Figure 2:
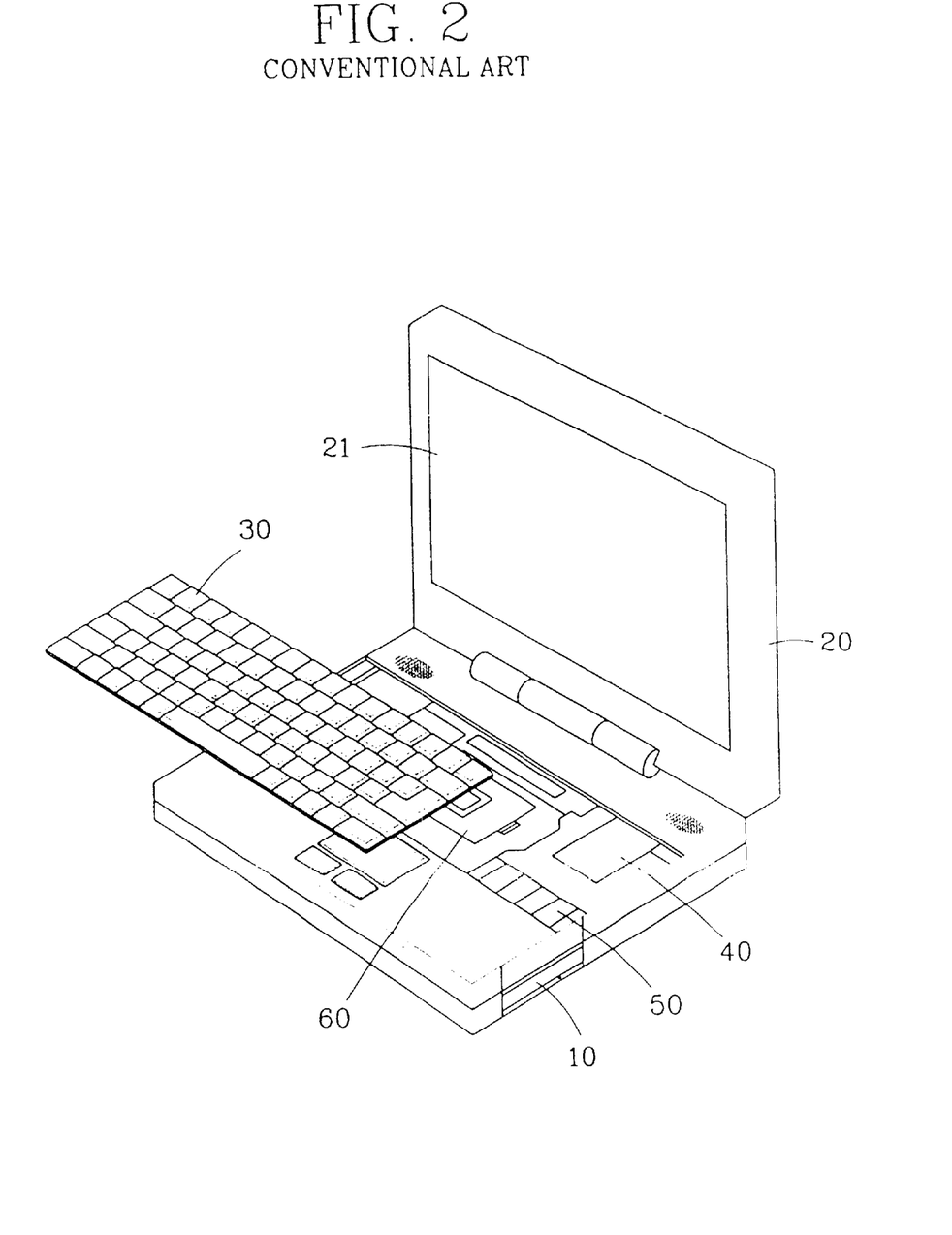
FIG. 2 is a perspective view illustrating a part of a conventional notebook PC.

FIG. 1 is a perspective view illustrating a conventional notebook PC (Personal Computer), and FIG. 2 is a perspective view illustrating a part of a conventional notebook PC.

As shown therein, the conventional notebook PC includes a main body 10, and a cover 20 tiltably engaged to a portion of the main body 10 for covering the upper portion of the main body 10.

A keyboard 30 is installed on the upper portion of the main body 10, and a display unit 21 is installed at an inner side of the cover 20.

A module type modem card 40, a memory 50 and a CPU 60 are installed inside the main body 10 below the keyboard 30 for performing various functions. These parts may be upgraded or changed.

In the conventional notebook PC, a part exchange portion (not shown) (e.g., a removable piece) is formed on a bottom portion or a lateral surface of the notebook PC, so that a certain part is installed via the part exchanging portion (not shown).

However, in the conventional notebook PC, parts are not easily exchanged or upgraded via the part exchanging portion (not shown). The strength and design of the notebook PC may be affected by the part exchanging portion (not shown).

Therefore, recently, as shown in FIG. 2, the keyboard 30 is detachable from the keyboard 30 so that it is possible to easily install or exchange a certain part after removing the keyboard 30.

In other words, the modem card 40, the memory 50 and the CPU 60 are installed below the keyboard 30, so that it is possible to upgrade a certain part by removing the keyboard 30.

Conventionally, a certain knob (not shown) or latch (not shown) is installed at the main body 10 for thereby fixing the keyboard 30, so that the keyboard 30 is not disengaged from the main body 10 after the above-described parts are installed.

Figure 3:
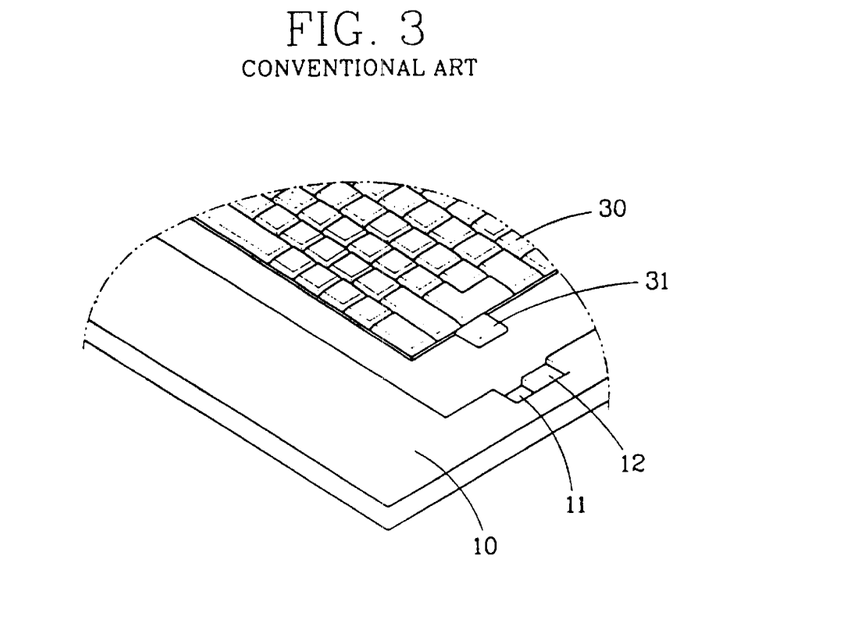
FIG. 3 is a view illustrating a conventional keyboard engaging structure for a notebook PC.

FIG. 3 illustrates a conventional keyboard engaging structure for a notebook PC. As shown therein, a protrusion 31 is formed at one side of the keyboard 30, and a groove 11 for receiving the protrusion 31 therein is formed at the main body 10. A latch 12, which is movable along the groove 11, is formed to prevent the protrusion 31 from escaping from the groove 11 by supporting the protrusion 31.

In the above-described conventional keyboard engaging structure for a notebook PC, the keyboard 30 is fixed to the main body 10 using the latch 12.

The above-described construction will be explained in detail. The modem card 40, the memory 50 and the CPU 60 are installed in the interior of the main body 10, and then the keyboard 30 is installed at the main body 10.

At this time, the protrusion 31 of the keyboard 30 is placed into the groove of the main body 10, and then the latch 12 is moved to contain the upper portion of the protrusion 31 of the keyboard 30. In this manner, the engaging operation of the keyboard 30 is completed.

When disengaging the keyboard 30 from the main body 10, the above-described operation is performed in the reverse sequence.

However, in the conventional keyboard engaging structure for a notebook PC, it is difficult to install a keyboard at the main board. In addition, since an engaging structure is formed on the upper portion of the keyboard deck, a good design of the notebook PC cannot be obtained.

In addition, when disengaging the keyboard from the main body, the locked state is unlocked by moving the small latch, and the keyboard is typically removed using an additional special tool. When re-engaging the keyboard, it is difficult to locate a small size latch.

SUMMARY OF THE INVENTION

Accordingly, it is an object of the present invention to provide a keyboard engaging structure for a notebook PC which is capable of facilitating upgrading a module installed in the interior of the notebook PC.

To achieve the above objects, there is provided a keyboard engaging structure for a notebook PC which includes a portable computer main body, a keyboard having one end engaged with the main body, a moveable latch in the main body to retain an opposite end of the keyboard, a slidable switch extending through a surface of the main body with which a user may retract the moveable latch, and a connecting assembly connected to the slidable switch and the moveable latch to transfer movement therebetween.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

The keyboard engaging structure for a notebook PC according to the present invention will be explained with reference to the accompanying drawings.

Figure 4:
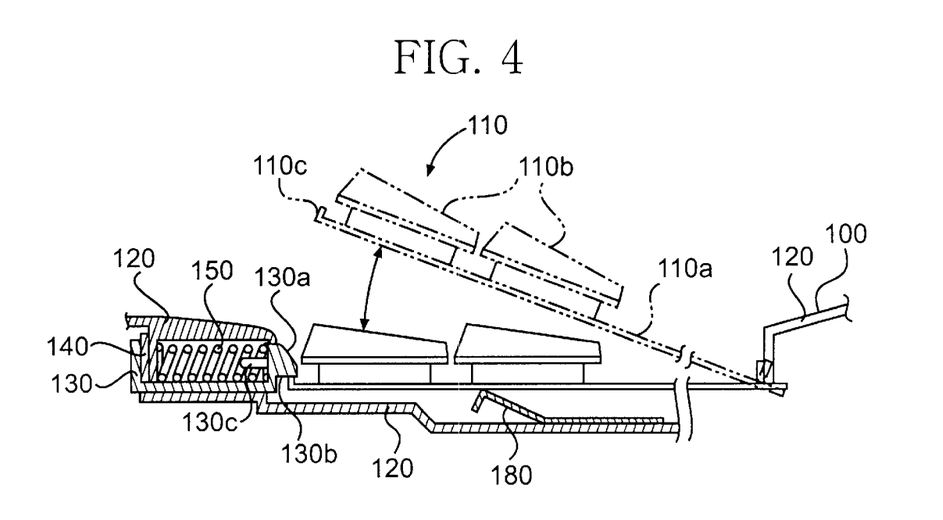
FIG. 4 is a lateral cross-sectional view illustrating a latch and lever plate structure for a keyboard engaging structure according to a first embodiment of the present invention.

FIG. 4 illustrates a latch and lever plate structure for a keyboard engaging structure for a notebook PC according to a first embodiment of the present invention.

Figure 5:
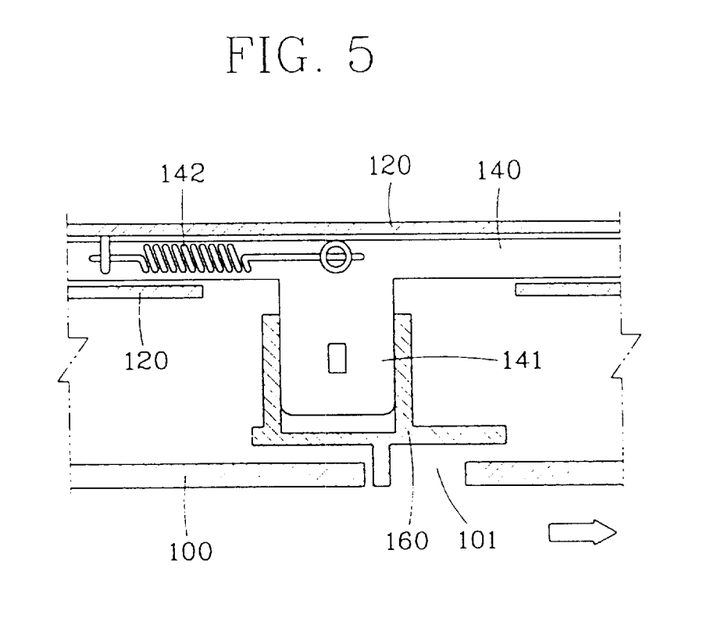
FIG. 5 is a front cross-sectional view illustrating an unlocking switch and lever plate for a keyboard engaging structure according to the first embodiment of the present invention.

As shown therein, the keyboard engaging structure for a notebook PC according to the present invention includes a keyboard 110 having a certain portion tiltably engaged to one side of the keyboard deck 120 of the main body 100 and installed detachably from the main body 100. The structure also includes a latch 130 installed in the interior of the other side of the keyboard deck 120 for latching or unlatching the other end of the keyboard 110, and a lever plate 140 passed through the interior of the latch 130 for forwardly and backwardly moving the latch 130. The structure also includes a latch spring 150 having its one end fixed to the keyboard deck 120 for elastically supporting the latch 130. As shown in FIG. 5, an unlocking switch 160 has its one end engaged with the protrusion 141 of the lever plate 140. The other end of the unlocking switch 160 protrudes at an elongated hole 101 on the lower surface of the main body 100 for moving the lever plate 140 in the left and right directions, so that the keyboard 110 is locked or unlocked by resulting movement of the latch 130. The structure also includes a lever spring 142 for elastically supporting the lever plate 140, and a pop-up plate 180 (see FIG. 4) disposed on the upper surface of the keyboard deck 120 for elastically supporting the keyboard 110 when the keyboard 110 is locked by the latch 130.

In detail, as shown in FIG. 4, in the keyboard 110, a plurality of keyboard character sets 110b are installed on the plate 110a, and one end of the plate 110a is rotatably engaged with the keyboard deck 120. An upwardly bent locking contact portion 110c is formed at the other end of the plate 110a.

Figure 8:
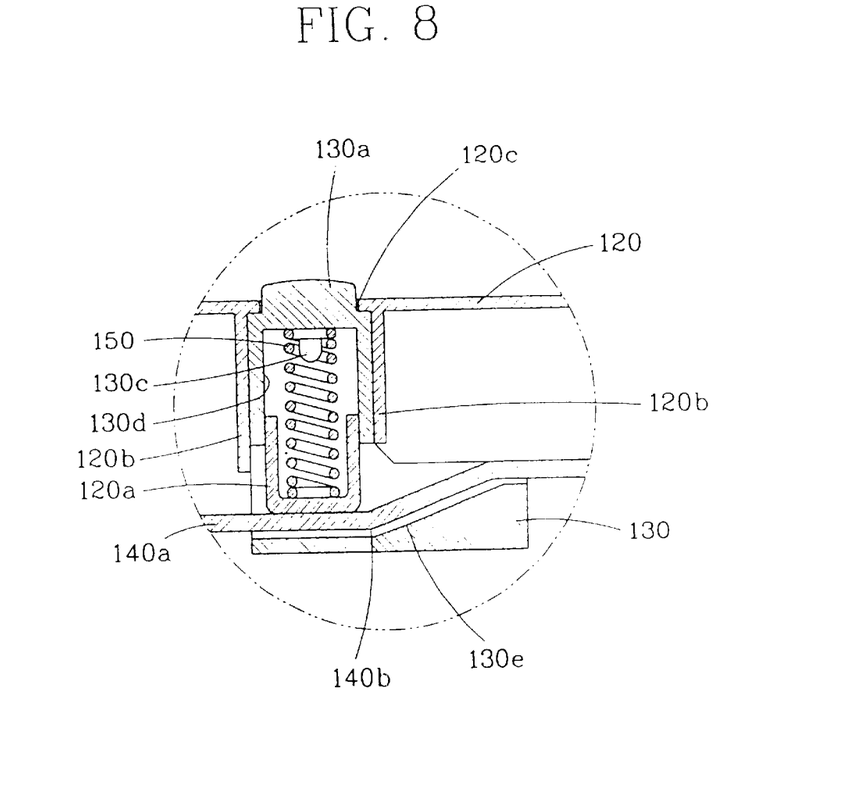
FIG. 8 is an expanded view of the portion A of FIG. 6 and a plan cross-sectional view illustrating a latch structure when a keyboard is engaged.

As shown in FIGS. 4 and 8, the latch 130 has a slanted upper end 130a which becomes a locking portion 130b contacting with the locking contact portion 110c. The locking portion 130b is formed at the lower portion of the latch 130. A slanted driving portion 130e is formed at the other end of the latch 130.

The latch 130 is installed at the engaging portion 120b protruding from the keyboard deck 120 and is movable in forward and backward directions. The slanted portion 130a and the locking portion 130b protrude from the groove 120c formed at the keyboard 120.

A guide portion 130d at which a latch spring 150 is installed is formed at an intermediate portion of the latch 130. A protrusion 130c extends from a center inner portion of the guide portion 130d for fixing an assembled position of the latch spring 150. The latch spring 150 is installed at the guide portion 130d and the guide portion 120a of the keyboard deck 120.

Figure 6:
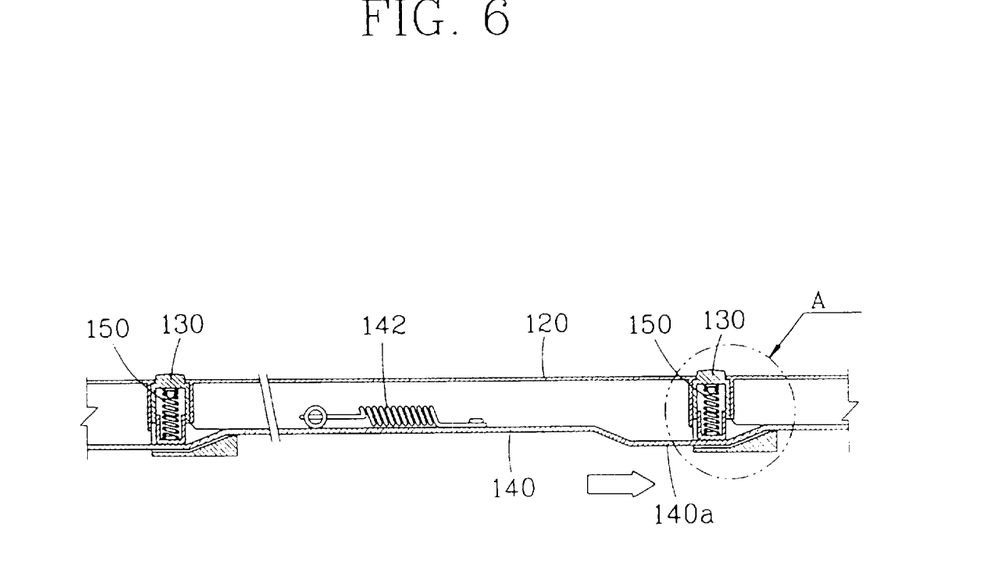
FIG. 6 is a plan cross-sectional view illustrating a latch and lever plate for a keyboard engaging structure according to the first embodiment of the present invention.

As shown in FIG. 6, the lever plate 140 is formed in a bar shape. A protrusion 140a is where the latch 130 is installed.

The protrusion 140a of the lever plate 140 is positioned to pass between the guide portion 120a of the keyboard deck 120 and the slanted driving portion 130e of the latch 130. An end portion 140b (see FIG. 8) of the protrusion 140a contacts the slanted driving portion 130e of the latch 130 when the lever plate 140 is moved in the left and right directions.

Referring to FIGS. 5 and 6, the lever spring 142 is installed at an intermediate portion of the lever plate 140. One end of the lever spring 142 is connected to the lever plate 140, and the other end of the lever spring 142 is fixed to the keyboard deck 120, so that the lever plate 140 is positioned at a left position by an elastic force of the lever spring 142. The end portion 140b of the protrusion 140a of the lever plate 140 does not contact the slanted driving portion 130e of the latch 130 in the left position.

The pop-up plate 180 may be installed on the lower surface of the keyboard plate 110a as shown in FIG. 4.

The operation for engaging the keyboard to the main body and disengaging the same from the main body will be explained in the above-described keyboard engaging apparatus of a notebook PC.

When engaging the keyboard 110 to the main body 100, a module (not shown) is installed in the interior of the keyboard deck 120 of the main body 100 for performing various functions.

One end of the keyboard plate 110a is then inserted into the keyboard deck 120 and is rotated in the downward direction. The locking contact portion 110c of the keyboard 110 contacts the slanted portion 130a of the latch 130. As the keyboard 110 is continuously rotated downward, the latch 130 compresses the latch spring 150 and is moved in the backward direction.

When the rotation of the keyboard 110 is completed, the latch spring 150 recovers and pushes the latch 130. The latch 130 is thus moved in the forward direction, and the locking portion 130b of the latch 130 locks the upper surface of the locking contact portion 110c of the keyboard 110, so that the keyboard 110 is fixed.

When disengaging the keyboard 110 from the main body 100 in order to upgrade a certain module (not shown) installed in the interior of the main body 100, the unlocking switch 160 protruding on the lower surface of the main body 100 is moved in the direction of the arrow shown in FIG. 5, so that the lever plate 140 connected to the unlocking switch 160 is moved in the direction of the arrow shown in FIG. 6.

When the lever plate 140 is moved, the end portion 140b of the protrusion 140c of the lever plate 140 which passes through the interior of the latch 130 contacts with the slanted driving portion 130e and pushes the slanted driving portion 130e. The latch 130 is backwardly moves in the direction of the arrow shown in FIG. 7, whereby the end of the keyboard 110 latched by the latch 130 is unlocked. The keyboard 110 is then rotated about a certain axis by an elastic force of the pop-up plate 180 for thereby disengaging the keyboard 110.

Figure 7:
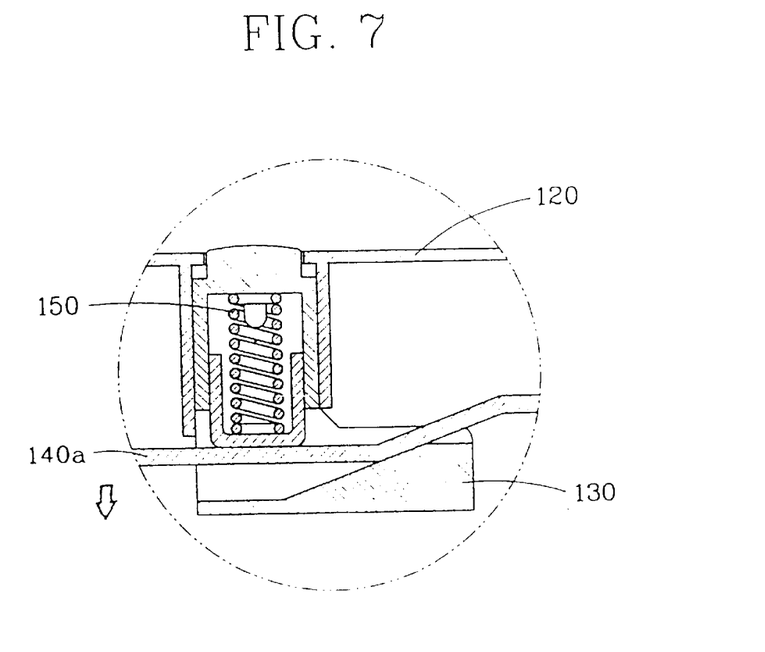
FIG. 7 is an expanded view of the portion A of FIG. 6 and a plan cross-sectional view illustrating a latch structure when a keyboard is disengaged.

After the keyboard 110 is disengaged, the lever plate 140 and the unlocking switch 160 are moved to the original positions by the recovering force of the lever spring 142, and the latch 130 is moved to the original position by the latch spring 150, so that the keyboard 110 is separated from the main body 100.

The keyboard engaging structure for a notebook PC according to a second embodiment of the present invention will be explained with reference to FIGS. 9 and 10.

Figure 9:
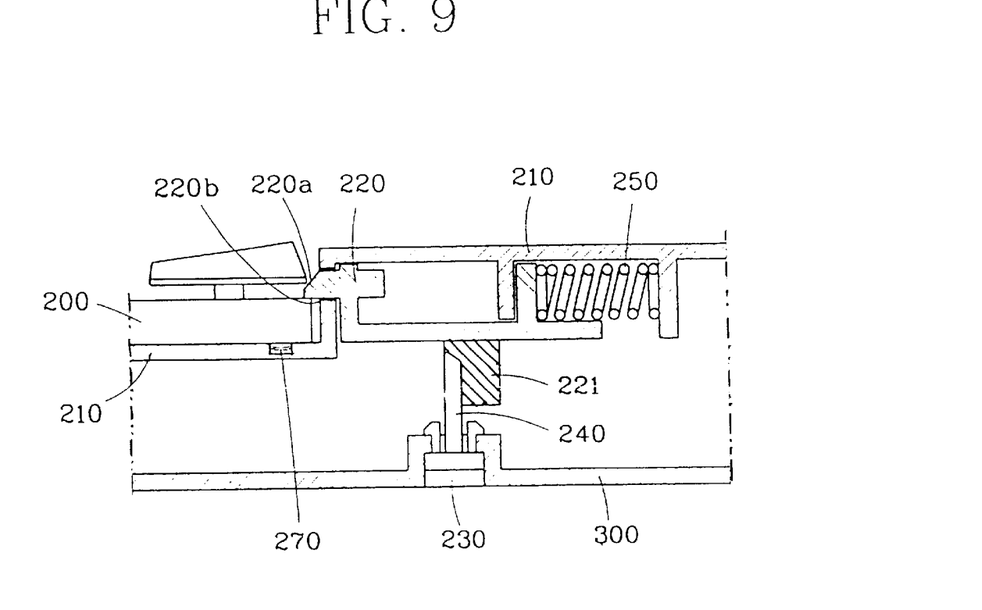
FIG. 9 is a lateral cross-sectional view illustrating a part of a keyboard engaging unit for a keyboard engaging apparatus according to a second embodiment of the present invention.
Figure 10:
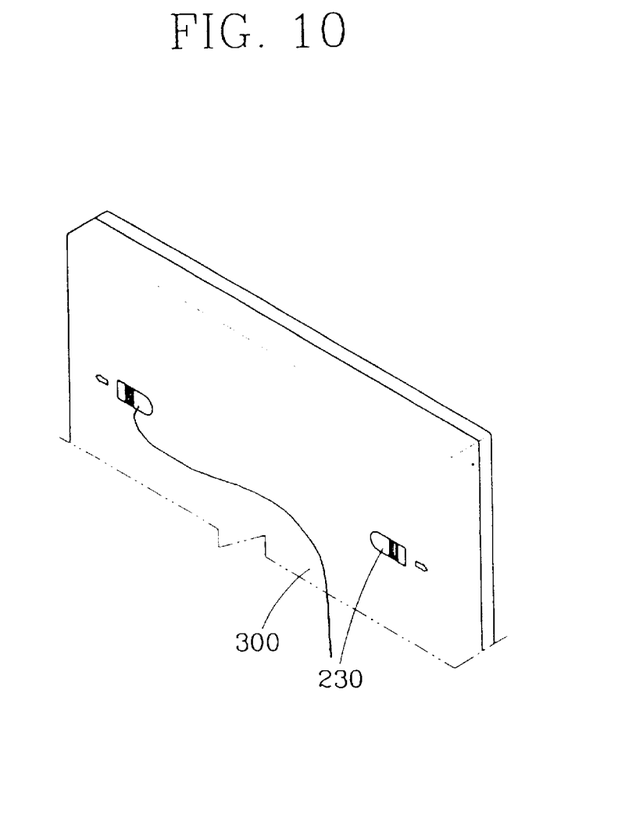
FIG. 10 is a perspective view illustrating a lower surface of a main body of a keyboard engaging apparatus of a notebook PC according to the second embodiment of the present invention.

FIG. 9 is a lateral cross-sectional view illustrating a part of a keyboard engaging unit for a keyboard engaging structure for a notebook PC according to a second embodiment of the present invention, and FIG. 10 is a perspective view illustrating a lower surface of a main body of a keyboard engaging apparatus of a notebook PC according to the present invention.

In the keyboard engaging structure for a notebook PC according to the second embodiment of the present invention, the unlocking switch is installed on a lower surface of the main body, and an operation unit is provided.

In detail, the keyboard engaging structure for a notebook PC includes a keyboard deck 210 for receiving a keyboard 200 thereon, and a pair of latches 220 for latching one end of the keyboard 200. The structure also includes a pair of unlocking switches 230 installed on a lower surface of the main body 300 for moving the latch 220 in the forward and backward directions and unlocking the keyboard 200. An operation unit 240 is connected with the unlocking switch 230 for operating the latch 220 based on the movement of the unlocking switch 230. A latch spring 250 has one end fixed to the keyboard deck 210 and the other end elastically supports the latch 220 for recovering the latch 220. A pop-up spring 270 is installed at the keyboard deck 210 below the keyboard 200 for rotating the keyboard 200 using an elastic force.

A slanted upper end of the latch 220 contacting with the keyboard 200 defines a slanted portion 220a contacting one end of the keyboard 200. A locking portion 220b is formed at a lower portion of the latch 220, and a protrusion 221 is formed at a center lower surface of the latch 220.

An engaging path, along which the operation unit 240 is movable, is defined by the protrusion 221 in FIG. 9. A slanted driving portion of the protrusion 221 increases in effective width in the direction that the operation unit 240 is moved. The operation unit 240 is slidably moved along the slanted driving portion of the protrusion 221, and thus the latch 220 is moved in the backward direction for unlocking the keyboard 200. The latch 220 is then recovered by the recovering force of the latch spring 250.

In the keyboard engaging structure for a notebook PC according to the second embodiment of the present invention, the operation for engaging and disengaging the keyboard will be explained.

First, since the operation for engaging the keyboard 200 is the same as the first embodiment of the present invention, its description will be omitted. The operation causing the keyboard 200 to be disengaged from the main body 300 will be explained.

When disengaging the keyboard 100 from the main body 300, the unlocking switches 230 are moved to both outer sides of the main body 300. Therefore, the operation unit 240 connected with each unlocking switch 230 is moved. The operation unit 240 is slidably moved along the slanted driving portion (not shown) of the protrusion 221 of the latch 220, and each latch 220 is moved in the backward direction.

When the latch 220 is moved in the backward direction, the keyboard 200 constrained by the latch 220 is unlatched, and the keyboard 200 is rotated and disengaged by the elastic force of the pop-up spring 270.

After the keyboard 200 is disengaged, the latch 220 is moved to the original position by the latch spring 250. Therefore, the operation unit 240 and the unlocking switch 230 are moved to the original position, so that the keyboard 200 is separated.

As described above, in the keyboard engaging structure for a notebook PC according to the present invention, the fixing unit for fixing the keyboard to the main body is hidden, so that a good design of the notebook PC is obtained.

In addition, when upgrading or changing the module installed in the interior of the main body, the keyboard is easily disengaged from the main body without using a certain tool, so that it is possible to implement an effective maintenance of the notebook PC.

Though the above invention has been described with reference to a notebook PC, it is intended to be applicable to providing access to the interior of portable computers, handheld computers, and portable digital assistants (PDA), generally. Similarly, though the unlocking switches have been shown extending through a bottom of the notebook PC enclosure, it is envisioned that such unlocking switches may extend through another surface of the portable computer. While the present invention discloses slanted members for transferring unlocking switch movement to a different direction to retract the latch, it is also envisioned that the unlocking switch and latch could be directly connected, in which case the directions of switch movement and latch movement would be the same.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A keyboard engaging structure for a portable computer, comprising:

a portable computer main body;

a keyboard having one end engaged with the main body;

a plurality of moveable latches movably disposed in the main body to retain an opposite end of the keyboard; and a slidable switch extending through an outer surface of the main body and operably connected with the plurality of movable latches, by means of which a user may retract the plurality of moveable latches by manually operating the slidable switch.

2. The keyboard engaging structure of claim 1, further comprising:

a spring located under the keyboard to propel the keyboard in an upward direction when the plurality of latches are retracted.

3. The keyboard engaging structure of claim 2, wherein the spring is attached to the main body.

4. The keyboard engaging structure of claim 2, wherein the spring is attached to the keyboard.

5. The keyboard engaging structure of claim 1, wherein the one end of the keyboard is rotatably engaged with the main body.

6. The keyboard engaging structure of claim 1, wherein the slidable switch extends through the surface of the main body opposite the keyboard.

7. The keyboard engaging structure of claim 1, wherein each of said plurality of moveable latches includes, a slanted portion to move a latch inward when the keyboard contacts the slanted portion during insertion; and a holding portion opposite the slanted portion to contact and retain the keyboard after insertion.

8. The keyboard engaging structure of claim 1, wherein each of said plurality of moveable latches includes, a spring to outwardly bias a latch so that a latch extends from the main body unless acted upon by the connecting member.

9. The keyboard engaging structure of claim 8, wherein each of said plurality of moveable latches includes, a retaining portion to limit movement of a latch in a direction extending from the main body.

10. The keyboard engaging structure of claim 1, wherein a direction of movement of the plurality of latches is different from a direction of movement of the slidable switch.

11. The keyboard engaging structure of claim 10, wherein the direction of movement of the plurality of latches is orthogonal to the direction of movement of the slidable switch.

12. The keyboard engaging structure of claim 11, wherein the connecting assembly includes, a slanted member connected to each of said plurality of latches to transfer motion in one direction to motion in an orthogonal direction; and an extending member connected to the slidable switch and contacting the slanted member upon movement of the slidable switch.

* * * * *